United States Patent [19]

Hall et al.

[11] Patent Number: 4,643,057

[45] Date of Patent: Feb. 17, 1987

[54] CUTTING TOOLS

[75] Inventors: Trevor J. Hall, Melton Mowbray; Robert E. Beechey, Oakham, both of England

[73] Assignees: The Victaulic Company PLC, Hertfordshire; Rutland Plastics Limited, Leicestershire, both of England

[21] Appl. No.: 660,749

[22] Filed: Oct. 15, 1984

[30] Foreign Application Priority Data

Oct. 24, 1983 [GB] United Kingdom ................. 8328392

[51] Int. Cl.[4] ............................................. B23B 29/04
[52] U.S. Cl. ......................................... 82/36 R; 82/5; 82/24 A; 408/180; 409/348
[58] Field of Search ................ 82/36 R, 24 A, 5; 409/348; 408/159, 180, 187, 239

[56] References Cited

U.S. PATENT DOCUMENTS

| 1,461,608 | 7/1923 | Foley | 409/348 |
| 2,269,320 | 1/1942 | Rosborough | 409/348 |
| 2,525,216 | 10/1950 | Garrand | 409/348 |
| 3,320,831 | 5/1967 | Bullard | 409/348 |
| 3,323,393 | 6/1967 | Soykan | 409/348 |

Primary Examiner—Nicholas P. Godici
Assistant Examiner—Jerry Kearns
Attorney, Agent, or Firm—Kinney & Lange

[57] ABSTRACT

The invention provides a cutting tool for incising a helical cut around the internal surface of a hollow member comprising a tool carrier adapted for insertion into the hollow member adjacent the internal surface thereof to be cut; a cutting block carried by the tool carrier and adapted so as to be located, in use, within the hollow member, the block being freely pivotally mounted on the carrier about an axis normal to the axis of relative rotation, in use, of the carrier and the hollow member, and a cutting member secured to the cutting block and extending from the block generally parallel to the axis of pivot thereof upon the carrier, and being arranged such that, in use, as the tool moves (relative to the hollow member) in a helical path around the internal surface, the cutting edge of the cutting member moves (relative to the hollow member) in a direction generally towards the axis of the pivot of the cutting block on the shaft.

10 Claims, 5 Drawing Figures

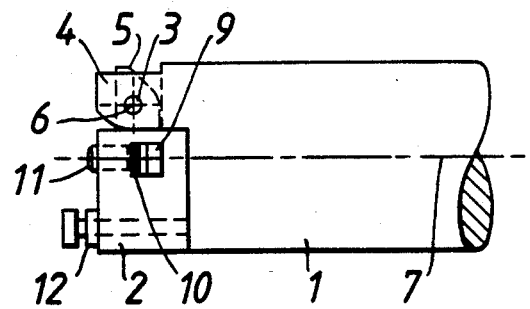
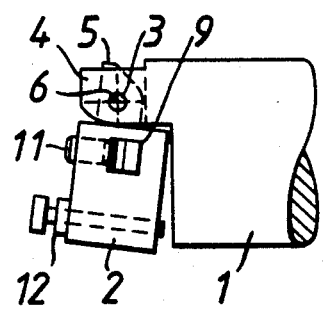
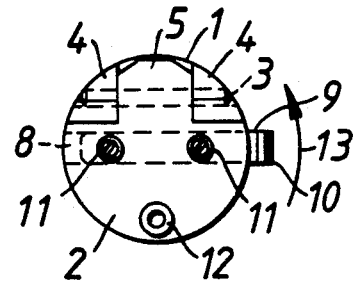
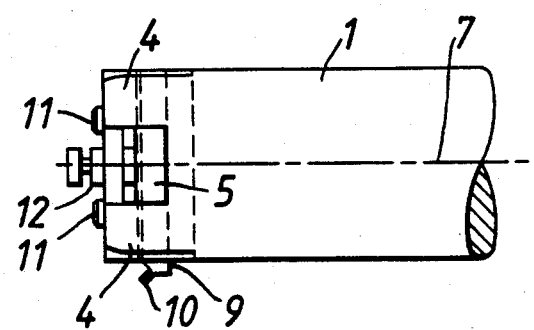

CUTTING TOOLS

BACKGROUND OF THE INVENTION

This invention relates to cutting tools. More particularly the invention relates to tools for making a helical incision around the inner surface of hollow bodies, such as tubular hollow bodies.

Such tools have been proposed in which the cutting blade is mounted on a shaft arranged to project within the hollow body parallel to the axis thereof the cutting blade projecting outwardly from the shaft so as to impinge upon the internal surface of the hollow member. Appropriate axial and radial relative movement between the shaft and the member to be cut then results in the formation of a helical cut. Usually the relevant movement is caused by rotating the hollow member with the cutting blade engaging the internal surface of the body, and at the same time axially moving the shaft carrying the cutting blade.

Such a cutting operation is required, for example, in the production of electroweld couplings for thermoplastic pipes. In this case a sleeve of thermoplastic material is provided, in one type of such coupling, with a heating wire inserted in helical fashion within the internal surface thereof. The insertion of the wire can be achieved by incising a helical cut or groove around the internal surface of the sleeve, and then inserting the heating wire into the cut or groove so formed. Couplings of this kind can utilise a sleeve of a very wide range of sizes, from say 20 mm internal diameter up to 200 mm internal diameter.

It has been found in practical usage of electroweld couplings of the kind mentioned hereinabove that for couplings intended to connect together two pipes, whilst there is need for a relatively close pitched helical formation of the heating wire adjacent each end of the coupling so as to achieve satisfactory melting and fusion of the coupling sleeve and pipes during the fusion process, there is no need for the same close pitched spiral across the central portion of the coupling sleeve, and indeed the provision of a close pitched spiral throughout the total length of the sleeve can be disadvantageous in that greater electrical power is required for fusion than is necessary on an optimum efficiency basis, and that an unnecessary length of heating wire is incorporated in the sleeve.

It has been proposed that the cutting tool should be programmed so as to form a close pitched helical incision adjacent each end of the coupling sleeve, whilst a much wider pitch should be provided over the central portion of the sleeve such that, for example, the tool traverses the central portion in 1 or 1.5 revolutions of the coupling sleeve relative to the tool.

A difficulty arising from such a proposal however is that the cutting tool must be capable of cutting at a variable helix angle. This in practice would require a "backing off" or tapering of the cutting blade from its leading to its trailing edge to enable the different helix angles to be cut without the trailing edge of the tool fouling on a side of the incision made. With the dimensions of the range of pipes concerned, and the consequent dimensions of the tool and its cutting blade, adequate backing off to achieve the variation in helix angle is difficult to achieve and results in a substantially weakened cutting blade.

It is an object of the present invention to overcome or at least substantially reduce the above mentioned problem.

SUMMARY OF THE INVENTION

According to the invention there is provided a cutting tool for incising a helical cut around the internal surface of a hollow member comprising a tool carrier adapted for insertion into the hollow member adjacent the internal surface thereof to be cut; a cutting block carried by the tool carrier and adapted so as to be located in use, within the hollow member, the block being freely pivotally mounted on the carrier about an axis normal to the axis of relative rotation, in use of the carrier and the hollow member; and a cutting member secured to the cutting block and extending from the block generally parallel to the axis of pivot thereof upon the carrier, and being arranged such that in use, as the tool moves (relative to the hollow member) in a helical path around the internal surface, the cutting edge of the cutting member moves (relative to the hollow member) in a direction generally towards the axis of the pivot of the cutting block on the shaft.

The tool carrier may comprise a shaft adapted for alignment in use with its longitudinal axis parallel to the axis of relative rotation of the tool and the hollow member. The cutting block may be carried at one end of the shaft and extend generally axially thereof, said block being freely pivotally mounted on the end of the shaft about an axis offset from and normal to the axis of the shaft.

The cutting member may be mounted on the cutting block approximately such that in use it intersects the axis of the shaft normally thereto.

The cutting block may be provided with a stop, which may be adjustable, so as to limit its movement about its pivot connection to the shaft. Such limit may be in one or both senses of movement.

By means of the invention a range of helix angles of cutting by the cutting tool can be readily accommodated, in that in use as the shaft is withdrawn from the rotating hollow member being cut, the cutting block will turn on its pivot connection to the shaft such that the cutting member is aligned with the desired angle required, such angle being determined by the relative rotational and axial speeds of the hollow member and tool respectively.

The cutting member may have a cutting blade inclined to the surface of the internal wall of the hollow member being cut so as to provide an inclined or angled incision helically around the internal wall. The angle of inclination may be between 40° and 50°.

In order that the invention may be more readily understood one embodiment thereof will now be described by way of example with reference to the accompanying drawings in which:

BRIEF DESCRIPTION OF THE DRAWINGS

FIG. 2 is a side elevation of the tool of FIG. 1;

FIG. 3 is a side elevation of the tool of FIG. 1 showing the cutting block in a different angle of position on its pivot pin;

FIG. 4 is an end elevation of the tool of FIG. 1; and

FIG. 5 is a top plan view of the tool of FIG. 1.

DETAILED DESCRIPTION OF THE DRAWINGS

Figure 1:
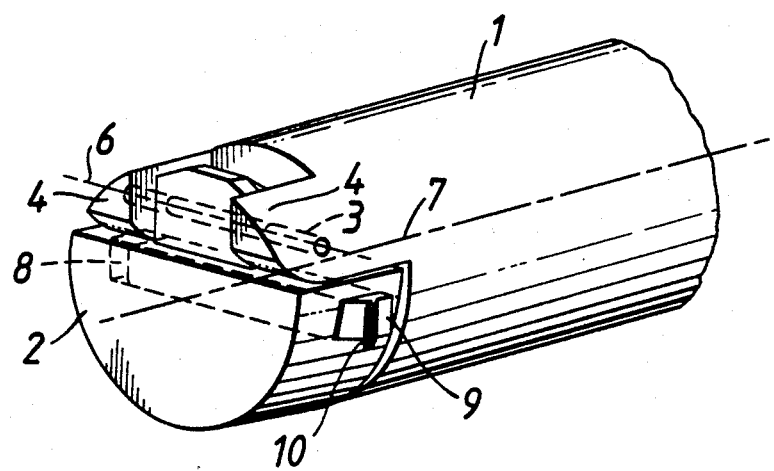
FIG. 1 is a schematic isometric view of one end of part of a cutting tool according to the invention.

The tool illustrated is intended to provide an incision within the inner wall of a thermoplastic sleeve for an electroweld coupling within which a heating wire may be located.

Referring to the drawings it will be seen that the cutting tool comprises a cylindrical steel shaft 1 carrying at one end a cutting block 2. The cutting block is pivotably and freely mounted on the shaft by means of a pivot pin 3 which passes through two longitudinally extending collars 4 of the shaft and through a spur 5 of the cutting block. As can be seen, the pivot pin 3 is located on an axis 6 offset from and normal to the longitudinal axis 7 of the shaft.

The cutting block 2 is provided with a rectangular section bore 8 within which is located a cutting member 9 from which protrudes a cutting blade 10. The cutting member 9 is held within the block by means of screws 11. (not shown on FIG. 1 for the sake of clarity). As can be seen the cutting member is located so as to pass, when in use, through the axis of the shaft, the cutting member 9 lying generally parallel to the axis of the pivot pin, and the cutting blade 10 passing through a plane including the axis of the shaft and parallel to the axis of the pivot pin. As can be seen in comparing FIGS. 2 and 3, the cutting block is capable of pivotal movement about the pivot pin between a position where it abuts against the end of the shaft, and a position where it is considerably separated from the end of the shaft. A set screw 12 (not shown in FIG. 1 for the sake of clarity) is provided such that the abutting position of the cutting block against the shaft can be controlled.

As can best be seen in FIGS. 1 and 5 the cutting blade 10 is at an angle of 45° to the general longitudinal direction of the cutting member. This ensures that the internal surface of the sleeve to be cut is provided with an inclined incision of an equivalent angle.

In operation the tool is mounted in accordance with normal practice in a lathe and is disposed within and at the innermost end of a sleeve (not shown) mounted for rotation about the shaft. The shaft is so aligned that the cutting edge of the blade cuts into the internal wall of the sleeve. The sleeve is then rotated such that the cutting edge 14 of blade 10 moves in the direction of the arrow 13 (shown in FIG. 4) relative to the sleeve, whilst at the same time the shaft is withdrawn from the sleeve so that the cutting blade 10 incises a close pitched helix in the internal wall of the sleeve. At this time the cutting block 2 is located as illustrated in FIG. 2. The cutting operation continues until an adequate extent of close pitch helix is formed at that end of the sleeve. Whilst rotation of the sleeve continues, the rate of withdrawal of the shaft is now increased so that the helix angle of the incised cut is significantly increased. The increase in withdrawal rate of the shaft causes the cutting block to pivot to the position shown in FIG. 3 to enable the cutting blade to follow and incise at the required helix angle. By this means a sharp angled helix is cut across the central portion of the sleeve. In practice this can be such as to provide a spacing between turns of, for example, between 25 and 50% of the diameter of the sleeve.

Once the required predetermined central portion of the sleeve has been passed the withdrawal rate of the shaft from the rotating sleeve can be reduced so that a second series of helical close pitched incisions can be made adjacent the second end of the sleeve. During this operation the cutting block relocates on the shaft in the position shown in FIG. 2.

After the cutting operation by means of the cutting tool according to the invention a heating wire may be laid in the helical incision formed within the sleeve which may then be used in normal manner for electrofusion coupling purposes.

By means of the invention we have provided a cutting tool capable of forming within hollow members a helical incision of variable pitch angle without any need to "back off" the cutting blade, whilst still ensuring satisfactory clean cutting of the workpiece.

What is claimed is:

1. A cutting tool for incising a helical cut around the internal surface of a hollow member comprising: tool carrier means defining a longitudinal axis for insertion into the hollow member adjacent the internal surface thereof to be cut; cutting block means carried by the tool carrier means, the block means being freely pivotally mounted on the carrier about an axis normal to the axis of relative rotation of the carrier means and the hollow member; and a cutting member secured to the cutting block means and extending from the block means generally parallel to the axis of pivot thereof upon the carrier means, whereby as the tool moves in a helical path around the internal surface, the cutting edge of the cutting member moves in a direction generally towards the axis of the pivot of the cutting block means on the tool carrier means, whereby in cutting use the cutting block means turns on its pivot connection on the tool carrier means such that the cutting member is aligned with and cuts at a helical angle determined by the relative rotational and axial speeds of the hollow member and tool during cutting.

2. A cutting tool as claimed in claim 1 wherein the tool carrier means comprises a shaft aligned with its longitudinal axis parallel to the axis of relative rotation of the tool and the hollow member.

3. A cutting tool as claimed in claim 2 wherein the cutting block means is carried at one end of the shaft and extends generally axially thereof, said block means being freely pivotally mounted on one end of the shaft about an axis offset from and normal to the axis of the shaft.

4. A cutting tool as claimed in claim 3 wherein the cutting member is mounted on the cutting block means approximately such that in use it intersects the axis of the shaft normally thereto.

5. A cutting tool as claimed in claim 2 wherein cutting block means is provided with a stop to limit its movement about its pivot connection to the shaft.

6. A cutting tool as claimed in claim 5 wherein the stop is adjustable.

7. A cutting tool as claimed in claim 5 wherein the stop acts to limit movement in one sense only.

8. A cutting tool as claimed in claim 1 wherein the cutting member has a cutting blade inclined to the surface of the internal wall of the hollow member being cut so as to provide an inclined or angled incision helically around the internal wall.

9. A cutting tool as claimed in claim 8 wherein the cutting blade is inclined at an angle of inclination of between 40° and 50°.

10. A cutting tool for incising a helical cut around the internal surface of a hollow member comprising: tool carrier means for insertion into the hollow member adjacent the internal surface thereof to be cut, the tool carrier means comprising a shaft with its longitudinal axis aligned parallel to the axis of relative rotation of the tool and the hollow member; cutting block means carried by the tool carrier means and extending generally axially thereof, the block means being freely pivotally mounted on the carrier means about an axis offset from and normal to the axis of the shaft; and a cutting member secured to the cutting block means and extending from the block means with its longitudinal axis generally parallel to the axis of pivot thereof upon the carrier means and approximately intersecting the axis of the shaft normally thereto, whereby as the tool moves in a helical path around the internal surface, the cutting edge of the cutting member moves in a direction generally towards the axis of the pivot of the cutting block means on the shaft; whereby in cutting use the cutting block means turns on its pivotal connection on the tool carrier means such that the cutting member is aligned with and cuts at a helical angle determined by the relative rotational and axial speeds of the hollow member and tool during cutting.

* * * * *